US 8,942,250 B2

(12) United States Patent
Klein et al.

(10) Patent No.: US 8,942,250 B2
(45) Date of Patent: Jan. 27, 2015

(54) SYSTEMS AND METHODS FOR PROVIDING SERVICE ("SRV") NODE SELECTION

(75) Inventors: Philippe Klein, Jerusalem (IL); Avraham Kliger, Ramat Gan (IL); Yitshak Ohana, Givat Zeev (IL)

(73) Assignee: Broadcom Corporation, Irvine, CA (US)

( * ) Notice: Subject to any disclaimer, the term of this patent is extended or adjusted under 35 U.S.C. 154(b) by 39 days.

(21) Appl. No.: 12/897,046

(22) Filed: Oct. 4, 2010

(65) Prior Publication Data

US 2011/0080850 A1    Apr. 7, 2011

Related U.S. Application Data

(60) Provisional application No. 61/249,592, filed on Oct. 7, 2009, provisional application No. 61/250,952, filed on Oct. 13, 2009, provisional application No. 61/252,950, filed on Oct. 19, 2009.

(51) Int. Cl.
*H04L 12/28* (2006.01)
*H04L 29/08* (2006.01)

(52) U.S. Cl.
CPC .......... *H04L 12/2801* (2013.01); *H04L 12/281* (2013.01); *H04L 67/16* (2013.01)
USPC ............................. 370/420; 370/349; 709/226

(58) Field of Classification Search
USPC .......................................... 370/254, 312, 352
See application file for complete search history.

(56) References Cited

U.S. PATENT DOCUMENTS

| | | | |
|---|---|---|---|
| 3,836,888 A | 9/1974 | Boenke et al. | |
| 4,413,229 A | 11/1983 | Grant | |
| 4,536,875 A | 8/1985 | Kume et al. | |
| 4,608,685 A | 8/1986 | Jain et al. | |

(Continued)

FOREIGN PATENT DOCUMENTS

| | | |
|---|---|---|
| CN | 1422043 | 6/2003 |
| CN | 1588827 | 8/2004 |

(Continued)

OTHER PUBLICATIONS

Multichannel News , MoCA Brewing Up Bigger Bandwidth, Dec. 15, 2008 Interview with CTO Anton Monk, http://www.multichannel.com/article/160878-MoCa_Brewing_Up_bigger_Bandwidth.php downloaded on Mar 29, 2009.

(Continued)

*Primary Examiner* — Brian O'Connor
(74) *Attorney, Agent, or Firm* — McDermott Will & Emery LLP

(57) ABSTRACT

Systems and methods for providing SRV node selection are provided. The method may include using an entry node to submit a query message in selected fields of a Device Attribute Information Element in L2ME protocol. The entry node may require an advanced service. The entry node may not be aware which node of the plurality of nodes is the node selected for supporting the advanced service on the network. The selected fields may include vendor specific fields. In response to the query message, the method may further include determining which of the plurality of nodes can be selected for supporting the advanced service on the network. The method may further include determining whether there is a one the plurality of nodes which has been selected for supporting the advanced service on the network.

34 Claims, 7 Drawing Sheets

(56) References Cited

U.S. PATENT DOCUMENTS

| | | |
|---|---|---|
| 4,893,326 A | 1/1990 | Duran et al. |
| 5,052,029 A | 9/1991 | James et al. |
| 5,170,415 A | 12/1992 | Yoshida et al. |
| 5,343,240 A | 8/1994 | Yu |
| 5,421,030 A | 5/1995 | Baran |
| 5,440,335 A | 8/1995 | Beveridge |
| 5,570,355 A | 10/1996 | Dail et al. |
| 5,638,374 A | 6/1997 | Heath |
| 5,671,220 A | 9/1997 | Tonomura |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,009,465 A | 12/1999 | Decker et al. |
| 6,028,860 A | 2/2000 | Laubach et al. |
| 6,055,242 A | 4/2000 | Doshi et al. |
| 6,069,588 A | 5/2000 | O'Neill, Jr. |
| 6,081,519 A | 6/2000 | Petler |
| 6,081,533 A | 6/2000 | Laubach et al. |
| 6,111,911 A | 8/2000 | Sanderford et al. |
| 6,118,762 A | 9/2000 | Nomura et al. |
| 6,157,645 A | 12/2000 | Shobatake |
| 6,167,120 A | 12/2000 | Kikinis |
| 6,192,070 B1 | 2/2001 | Poon et al. |
| 6,219,409 B1 | 4/2001 | Smith et al. |
| 6,229,818 B1 | 5/2001 | Bell |
| 6,243,413 B1 | 6/2001 | Beukema |
| 6,304,552 B1 | 10/2001 | Chapman et al. |
| 6,307,862 B1 | 10/2001 | Silverman |
| 6,434,151 B1 | 8/2002 | Caves et al. |
| 6,466,651 B1 | 10/2002 | Dailey |
| 6,481,013 B1 | 11/2002 | Dinwiddie et al. |
| 6,526,070 B1 | 2/2003 | Bernath et al. |
| 6,553,568 B1 | 4/2003 | Fijolek et al. |
| 6,563,829 B1 | 5/2003 | Lyles et al. |
| 6,567,654 B1 | 5/2003 | Coronel Arredondo et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,785,296 B1 | 8/2004 | Bell |
| 6,816,500 B1 | 11/2004 | Mannette et al. |
| 6,831,899 B1 | 12/2004 | Roy |
| 6,836,515 B1 | 12/2004 | Kay et al. |
| 6,859,899 B2 | 2/2005 | Shalvi et al. |
| 6,862,270 B1 | 3/2005 | Ho |
| 6,877,043 B2 | 4/2005 | Mallory et al. |
| 6,877,166 B1 | 4/2005 | Roeck et al. |
| 6,898,210 B1 | 5/2005 | Cheng et al. |
| 6,930,989 B1 | 8/2005 | Jones, IV et al. |
| 6,940,833 B2 | 9/2005 | Jonas et al. |
| 6,950,399 B1 | 9/2005 | Bushmitch et al. |
| 6,961,314 B1 | 11/2005 | Quigley et al. |
| 6,985,437 B1 | 1/2006 | Vogel |
| 6,996,198 B2 | 2/2006 | Cvetkovic |
| 7,035,270 B2 | 4/2006 | Moore et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,142,553 B1 | 11/2006 | Ojard et al. |
| 7,146,632 B2 | 12/2006 | Miller |
| 7,149,220 B2 | 12/2006 | Beukema et al. |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,372,853 B2 | 5/2008 | Sharma et al. |
| 7,460,543 B2 | 12/2008 | Malik et al. |
| 7,487,532 B2 | 2/2009 | Robertson et al. |
| 7,532,642 B1 | 5/2009 | Peacock |
| 7,532,693 B1 | 5/2009 | Narasimhan |
| 7,555,064 B2 | 6/2009 | Beadle |
| 7,574,615 B2 | 8/2009 | Weng et al. |
| 7,606,256 B2 | 10/2009 | Vitebsky et al. |
| 7,652,527 B2 | 1/2010 | Ido et al. |
| 7,653,164 B2 | 1/2010 | Lin et al. |
| 7,664,065 B2 | 2/2010 | Lu |
| 7,675,970 B2 | 3/2010 | Nemiroff et al. |
| 7,689,706 B2 * | 3/2010 | Jennings ................. 709/231 |
| 7,860,092 B2 | 12/2010 | Yoon et al. |
| 7,916,756 B2 | 3/2011 | Atsumi et al. |
| 8,060,615 B2 * | 11/2011 | Finn ........................ 709/226 |
| 8,176,181 B2 * | 5/2012 | Hyslop et al. .......... 709/226 |
| 8,184,550 B2 * | 5/2012 | Beck et al. .............. 370/252 |
| 2001/0039660 A1 | 11/2001 | Vasilevsky |
| 2002/0010562 A1 | 1/2002 | Schleiss et al. |
| 2002/0021465 A1 | 2/2002 | Moore et al. |
| 2002/0059623 A1 | 5/2002 | Rodriguez et al. |
| 2002/0059634 A1 | 5/2002 | Terry et al. |
| 2002/0069417 A1 | 6/2002 | Kliger |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0105970 A1 | 8/2002 | Shvodian |
| 2002/0136231 A1 | 9/2002 | Leatherbury |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0022683 A1 | 1/2003 | Beckmann et al. |
| 2003/0060207 A1 | 3/2003 | Sugaya et al. |
| 2003/0063563 A1 | 4/2003 | Kowalski |
| 2003/0066082 A1 | 4/2003 | Kliger |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1 | 1/2004 | Zhu et al. |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1 | 5/2005 | Wronski et al. |
| 2005/0152350 A1 | 7/2005 | Sung et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0059400 A1 | 3/2006 | Clark et al. |
| 2006/0062250 A1 | 3/2006 | Payne, III |
| 2006/0068708 A1 | 3/2006 | Dessert et al. |
| 2006/0078001 A1 | 4/2006 | Chandra et al. |
| 2006/0104201 A1 | 5/2006 | Sundberg et al. |
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |

(56) References Cited

U.S. PATENT DOCUMENTS

| | | |
|---|---|---|
| 2007/0025317 A1 | 2/2007 | Bolinth et al. |
| 2007/0040947 A1 | 2/2007 | Koga |
| 2007/0127373 A1 | 6/2007 | Ho et al. |
| 2007/0160213 A1 | 7/2007 | Un et al. |
| 2007/0171919 A1 | 7/2007 | Godman et al. |
| 2007/0183786 A1 | 8/2007 | Hinosugi et al. |
| 2007/0206551 A1 | 9/2007 | Moorti et al. |
| 2007/0217436 A1 | 9/2007 | Markley et al. |
| 2007/0253379 A1 | 11/2007 | Kumar et al. |
| 2007/0286121 A1 | 12/2007 | Kolakowski et al. |
| 2008/0037487 A1 | 2/2008 | Li et al. |
| 2008/0037589 A1 | 2/2008 | Kliger |
| 2008/0080369 A1 | 4/2008 | Sumioka et al. |
| 2008/0089268 A1 | 4/2008 | Kinder et al. |
| 2008/0117919 A1 | 5/2008 | Kliger |
| 2008/0117929 A1 | 5/2008 | Kliger |
| 2008/0130779 A1 | 6/2008 | Levi |
| 2008/0178229 A1 | 7/2008 | Kliger |
| 2008/0189431 A1* | 8/2008 | Hyslop et al. ............. 709/232 |
| 2008/0212591 A1 | 9/2008 | Wu et al. |
| 2008/0225832 A1 | 9/2008 | Kaplan et al. |
| 2008/0238016 A1 | 10/2008 | Chen et al. |
| 2008/0259957 A1 | 10/2008 | Kliger |
| 2008/0271094 A1 | 10/2008 | Kliger |
| 2008/0273591 A1 | 11/2008 | Brooks et al. |
| 2008/0279219 A1 | 11/2008 | Wu et al. |
| 2008/0298241 A1 | 12/2008 | Ohana |
| 2009/0010263 A1 | 1/2009 | Ma et al. |
| 2009/0063878 A1 | 3/2009 | Schmidt et al. |
| 2009/0092154 A1* | 4/2009 | Malik et al. ............. 370/480 |
| 2009/0106801 A1* | 4/2009 | Horii ............. 725/91 |
| 2009/0122901 A1 | 5/2009 | Choi et al. |
| 2009/0165070 A1 | 6/2009 | McMullin |
| 2009/0217325 A1 | 8/2009 | Kliger |
| 2009/0252172 A1 | 10/2009 | Hare |
| 2009/0254794 A1 | 10/2009 | Malik et al. |
| 2009/0257483 A1 | 10/2009 | French et al. |
| 2009/0279643 A1 | 11/2009 | Shusterman |
| 2009/0285212 A1 | 11/2009 | Chu et al. |
| 2009/0296578 A1 | 12/2009 | Bernard et al. |
| 2009/0316589 A1 | 12/2009 | Shafeeu |
| 2010/0031297 A1 | 2/2010 | Klein |
| 2010/0080312 A1 | 4/2010 | Moffatt et al. |
| 2010/0150016 A1 | 6/2010 | Barr |
| 2010/0158013 A1 | 6/2010 | Kliger |
| 2010/0158015 A1 | 6/2010 | Wu |
| 2010/0158021 A1 | 6/2010 | Kliger |
| 2010/0158022 A1 | 6/2010 | Kliger |
| 2010/0162329 A1 | 6/2010 | Ford et al. |
| 2010/0174824 A1 | 7/2010 | Aloni et al. |
| 2010/0185731 A1* | 7/2010 | Wu ............. 709/204 |
| 2010/0185759 A1* | 7/2010 | Wu ............. 709/223 |
| 2010/0238932 A1 | 9/2010 | Kliger |
| 2010/0246586 A1 | 9/2010 | Ohana |
| 2010/0254278 A1 | 10/2010 | Kliger |
| 2010/0254402 A1 | 10/2010 | Kliger |
| 2010/0281195 A1 | 11/2010 | Daniel et al. |
| 2010/0284474 A1 | 11/2010 | Kliger |
| 2010/0290461 A1 | 11/2010 | Kliger |
| 2010/0322134 A1* | 12/2010 | Wu ............. 370/312 |
| 2011/0001833 A1 | 1/2011 | Grinkemeyer et al. |
| 2011/0013633 A1 | 1/2011 | Klein |
| 2011/0113455 A1* | 5/2011 | Wu ............. 725/82 |
| 2011/0205891 A1 | 8/2011 | Kliger et al. |
| 2011/0206042 A1 | 8/2011 | Tarrab et al. |
| 2011/0310907 A1* | 12/2011 | Klein et al. ............. 370/401 |
| 2012/0093244 A1 | 4/2012 | Levi et al. |

FOREIGN PATENT DOCUMENTS

| | | |
|---|---|---|
| CN | 101399623 A | 4/2009 |
| CN | 101632268 A | 1/2010 |
| EP | 0 385695 | 9/1990 |
| EP | 0 622926 | 11/1994 |
| EP | 1501326 | 1/2005 |
| JP | 60160231 | 8/1985 |
| WO | WO 98/27748 | 6/1998 |
| WO | WO 98/31133 | 7/1998 |
| WO | WO 99/35753 | 7/1999 |
| WO | WO 99/46734 | 9/1999 |
| WO | WO 00/31725 | 6/2000 |
| WO | WO 00/55843 | 9/2000 |
| WO | WO 01/80030 | 10/2001 |
| WO | WO 02/19623 | 3/2002 |
| WO | WO-02/41577 A2 | 5/2002 |

OTHER PUBLICATIONS

Ovadia S., "MoCA: Ubiquitous Multimedia Networking in the Home," Proceedings of the SPIE—The International Society for Optical Engineering SPIE—The Internaitonal Society for Optical Engineering USA, [Online] 2007, XP002584642 ISSN: 0277-786X, Retrieved on Jul. 28, 2010 from the Internet: URL: http://spiedl.aip.org/getpdf/servlet/getPDFServlet?filetype=pdf&id=PSISDG00677600000167760C00000&idtype=cvips&prog=normal>, as cited in European Search Report.

International Search Report for International Application No. PCT/US03/27253 dated Dec. 30, 2003 (4 pgs).

International Search Report for International Application No. PCT/US03/27254 dated Feb. 3, 2004 (5 pgs).

"Home Networking on Coax for Video and Multimedia, Overview for IEEE 802.1AVB", Shlomo Ovadia, San Ramon/California, May 30, 2007.

"Microtune Introduces Industry's First 1-GHZ Cable Tuners Compatible with MoCA—Home Networking Standard", Business Wire, San Francisco, California, Mar. 19, 2007.

* cited by examiner

SYSTEMS AND METHODS FOR PROVIDING SERVICE ("SRV") NODE SELECTION

CROSS-REFERENCED TO RELATED APPLICATIONS

This application is a non-provisional of U.S. Provisional Patent No. 61/249,592, filed Oct. 7, 2009, entitled "SRV Node Selection L2ME Transaction", U.S. Provisional Patent Application No. 61/250,952, filed on Oct. 13, 2009, entitled "Dynamic SRV Node Selection L2ME Transaction" and U.S. Provisional Patent Application No. 61/252,950, filed on Oct. 19, 2009, entitled "SRV Selection on MoCA Network", each of which are incorporated by reference herein in their respective entireties.

FIELD OF TECHNOLOGY

The present invention relates generally to information networks and specifically to transmitting information such as media information over communication lines such as coaxial cable (hereinafter "coax"), thereby to form a communications network.

BACKGROUND

Home network technologies using coax are known generally. The Multimedia over Coax Alliance (MoCA™) provides an example of a suitable specification (MoCA 1.1) for networking of digital video and entertainment through existing coaxial cable in the home which has been distributed to an open membership. The MoCA 1.1 specification is incorporated by reference herein in its entirety.

Home networking over coax taps into the vast amounts of unused bandwidth available on the in-home coax. More than 70% of homes in the United States have coax already installed in the home infrastructure. Many have existing coax in one or, more primary entertainment consumption locations such as family rooms, media rooms and master bedrooms—ideal for deploying networks. Home networking technology allows homeowners to utilize this infrastructure as a networking system and to deliver other entertainment and information programming with high QoS (Quality of Service).

The technology underlying home networking over coax provides high speed (270 mbps), high QoS, and the innate security of a shielded, wired connection combined with state of the art packet-level encryption. Coax is designed for carrying high bandwidth video. Today, it is regularly used to securely deliver millions of dollars of pay per view and premium video content on a daily basis. Home networking over coax can also be used as a backbone for multiple wireless access points used to extend the reach of wireless network throughout a consumer's entire home.

Home networking over coax provides a consistent, high throughput, high quality connection through the existing coaxial cables to the places where the video devices currently reside in the home. Home networking over coax provides a primary link for digital entertainment, and may also act in concert with other wired and wireless networks to extend the entertainment experience throughout the home.

Currently, home networking over coax works with access technologies such as ADSL and VDSL services or Fiber to the Home (FTTH), that typically enter the home on a twisted pair or on an optical fiber, operating in a frequency band from a few hundred kilohertz to 8.5 MHz for ADSL and 12 Mhz for VDSL. As services reach the home via xDSL or FTTH, they may be routed via home networking over coax technology and the in-home coax to the video devices. Cable functionalities, such as video, voice and Internet access, may be provided to homes, via coaxial cable, by cable operators, and use coaxial cables running within the homes to reach individual cable service consuming devices locating in various rooms within the home. Typically, home networking over coax type functionalities run in parallel with the cable functionalities, on different frequencies.

It would be desirable to achieve selection of the Selected SRV Node selection with MoCA devices connected by a MoCA home network.

SUMMARY

A system and/or method for selection of a Selected Service Node ("SSN") using MoCA devices connected by a MoCA home network, substantially as shown in and/or described hi connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
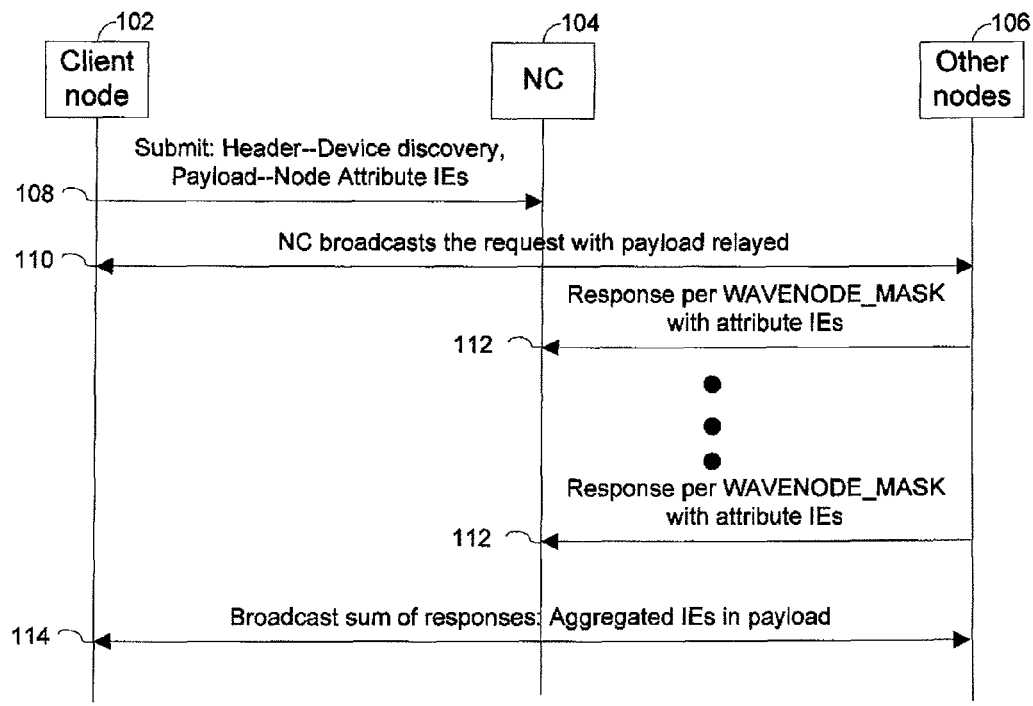
FIG. 1 shows a schematic diagram of an exemplary embodiment of messages exchanged during a L2ME protocol for use according to the invention.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

In addition, various signals representing data or events as described herein may be transferred between a source and a destination in the form of electromagnetic waves traveling through signal-conducting media such as metal wires, optical fibers, and/or wireless transmission media (e.g., air and/or space).

For ease of reference, the following glossary provides definitions for the various abbreviations and notations used in this patent application:

Digital PHY Includes port of the MoCA integrated circuit that forms a conduit for signals to and from a receiver and/or transceiver integrated circuit EN MoCA Existing Node (the term "node" may be referred to alternatively herein as a "module")

IE Information Element

L2ME (MoCA) Layer 2 Management Entity

MAC Media Access Controller—includes logic for MoCA integrated circuit that schedules opening and closing of the digital PHY as needed for transmission and/or receiving signals from the receiver and/or transceiver integrated circuit MAP Media Access Plan NC MoCA Network Controller PHY Physical Layer of MoCA Network QoS Quality of Service SRV Service—The generic name for a service that is run in a layer that is relatively higher than the MoCA layer SSN Selected SRV Node—The node selected to run the SRV service for all the devices connected to the same network Certain advanced services implemented over the MoCA network (such as IEEE 802.1 Audio Video Bridging Systems ("AVB") bandwidth reservation) may require the MoCA network to select one node to run a pre-determined service for the whole MoCA network.

If the service is optional, the Network Controller node ("NC") may not support this optional service. If the NC does not support this optional service, the NC cannot be selected as the SSN. Instead, any SRV-capable—i.e., capable of supporting the advanced, albeit, optional, service—may be selected as the SSN. In some embodiments of the invention, the SRV node selection protocols described herein are preferably orthogonal to the NC selection and NC handover/backup.

In some embodiments of the invention, possible SSN selection rules of an SRV-selected node may be as follows:

Such rules may include requiring a query message to be submitted by any SRV-capable node that may be admitted to the network, one embodiment of which is described below in FIG. 2, and the portion of the specification corresponding thereto.

At the completion of the query, any SRV-capable nodes that share the same SRV-node-query related information that is relayed by the entry node can be an SRV-selected node. Further, at the completion of the query, preferably all the SRV-capable nodes, including an entry node, as defined below, share the same information regarding which nodes on the network are SRV-capable and which single node, if any, is the SRV-selected node.

If there is no selected node at the end of the query, then the entry node may select itself and then send a notification of its own selection to the network. Alternatively, another of the SRV-capable nodes may be selected and then notify the NC of its selection.

Yet another embodiment of the invention may implement an efficient technique, as follows, to support dynamic SRV selection.

If the SRV-selected node is removed from the network (either via a graceful shut down/failure/and/or power save), this change of topology may be implemented at least in part via a network notification.

The SRV-capable node with the lowest node ID ("NID") becomes the SRV-selected node and a selection is submitted to notify the other nodes of the selection.

This scheme is preferably fully compliant with current MoCA specifications and preferably does not require any modification to the specifications.

In some embodiments of the invention, when the selected SRV node fails, another SRV-capable node can be dynamically selected as the new SSN. The SRV selection protocol presented may include a recovery protocol to dynamically select one of the SRV-capable nodes as the new SRV-selected node.

The SRV selection protocol can be based on the L2ME architecture message protocol specified in MoCA 1.1 specification and/or 2.0 specification, which are hereby incorporated herein in their respective entireties.

If no node is SRV-capable, an entry node may become the SRV-selected node.

If more than one node (in addition to the entry node) is SRV-capable and no node is the SRV-selected node, the entry node may select the SRV-capable node with the lowest NID as the SRV-selected node.

When SSN submits an SRV node selection L2ME message prior to entering power saved mode (see FIG. 4 below, and the portion of the specification corresponding thereto), an entry node may reset its own NID bit to correspond to the SSN bitmask.

An entry node response may be for confirming the entry node's SSN selection to the NC. In response to a communication regarding the SSN selection from the NC, all the other SRV-capable nodes may transmit an empty response (zero length payloads) to the NC.

FIG. 1 shows an exemplary embodiment of messages exchanged during a L2ME discovery protocol for use according to the invention. The L2ME-based device discovery protocol is for a node to discover the attributes of a specific set of other nodes.

FIG. 1 shows an exemplary client node 102, an NC 104 and other nodes 106. The first message 108 in the protocol is a submission—i.e., a node sends a request to the NC to run a "device discovery" transaction (a multi-way exchange of information between the NC and the other nodes of the network). The device discovery transaction enables MoCA nodes to discover each other's capabilities. Specifically, each MoCA node preferably has a set of associated attributes that characterize its capabilities, such as, for example, maximum aggregation size and number of packets it can process. These attributes can also be proprietary to vendors. Message 108 preferably includes a header that the message is directed to device discovery. Message 108 further includes a payload indicating that the discovery is directed to node attribute IEs. Thus, the L2ME device discovery protocol enables preferably any node in the MoCA network to retrieve the attributes of one or more specific nodes in the MoCA Network.

The NC preferably broadcasts the request to other nodes 106. The NC preferably relays the payload with the request. Each of the other nodes 106 sends a response, at 112. Each of the other nodes 106 preferably identify themselves by a field characterized by a specific bit configuration. Such a field may be generically referred to as a WAVENODE MASK or, alternatively as a bitmask, or node ID ("NID") bitmask. Such a mask preferably indicates a range of internet protocol ("IP") addresses. Such addresses may be used to identify the IP addresses for nodes that are SRV-capable.

Each of the responses 112 preferably include the attribute IEs corresponding to each of the other nodes 106. At 114, the NC preferably broadcasts the sum of responses in a message 114. The sum of response messages 114 preferably includes a payload that includes aggregated IEs for each of the other nodes 106 that responded to the device discovery.

Figure 2:
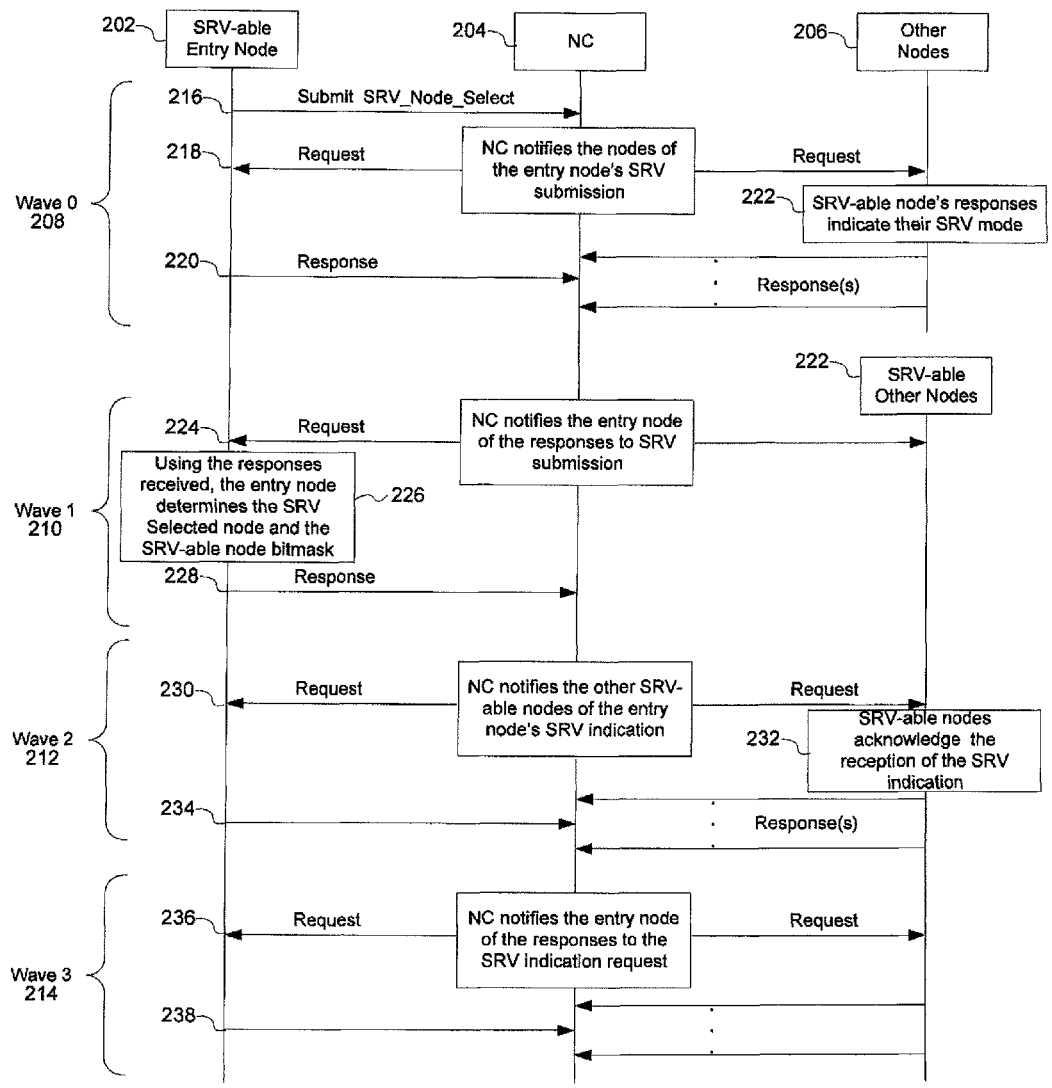
FIG. 2 shows a schematic diagram of an exemplary embodiment of messages exchanged during an SRV node selection transaction according to the invention.

FIG. 2 shows a schematic diagram of one embodiment of messages exchanged during an SRV node selection transaction according to the invention. FIG. 2 preferably includes messages exchanged from an SRV-capable entry node 202, an NC 204 and other nodes 206. For purposes of this application, the entry node is a node that requires the SRV service and does not know which node is the SSN. The entry node is further identified as the node that submits a transaction request (defined in more detail below) to the NC. As specified in IEEE 802.1Qat specification, for example, this SRV protocol is used to select the designated Multiple Stream Reservation Protocol ("MSRP") node ("DMN").

Messages, as shown schematically in FIG. 2, preferably utilize, in a method according to the invention, the L2ME messaging protocol, at least in part, to determine the SRV-ability of each of the nodes on the network. Thus, a device discovery protocol according to the invention leverages the L2ME message architecture and protocol(s) in order to obtain information regarding the SRV-ability of each of the nodes on the network.

The messaging protocol includes wave 0 208, wave 1 210, wave 2 212, and wave 3 214. Wave 0 208 includes a first message submission 216 to NC 204, by entry node 202. Entry node 202 preferably is a node that requires the SRV service and does not know which node is the SSN. To reiterate, at 216, entry node 202 submits a request for an SSN transaction on the network.

At 218, NC 204 preferably notifies the nodes of the entry node's SSN request. Other nodes 206, and entry node 202, respond to the SSN request 218 at 220.

In wave 1 210, at 224, NC 204 notifies entry node 202, as well as the other SRV-capable nodes 222, regarding the responses to the SSN request. Using the responses received at 226, entry node 202 may build a SRV notification message indicating the SRV-capable bitmask (the bitmask that defines which nodes are SRV-capable) and the SRV-selected bitmask (the bitmask which defines which node, if any, is the SSN). In one embodiment of the invention, when the entry node determines that the network already has an SSN, then the entry node can acquiesce to the SSN that is already existent in the network. If there is no SSN in the network, then the entry node can initiate a node selection transaction, and determine whether the entry node should become the SSN or another—e.g., a node with a lower NID, should become the SSN. At 228, the entry node may communicate the information regarding the two bitmasks to the NC.

In wave 2 212, at step 230, NC 204 notifies the other SRV-capable nodes 222 of the entry node's SRV bitmask determinations 226. SRV-capable nodes 222 transmit to NC 204 their acknowledgement of the entry node's determinations, at 232.

In wave 3 214, NC 204 may then notify, in L2ME's concatenated format, as set forth in MoCA specification 1.1, which is hereby incorporated by reference herein in its entirety, or any other suitable MoCA specification, the entry node, as well as the other SRV-capable nodes, of the responses to the SRV indication request, as shown at 234. Preferably thereafter, SRV-capable nodes 222 may respond to the notification at 236. Entry node 202 may preferably respond to this notification with an empty response, at 238.

Figure 3:
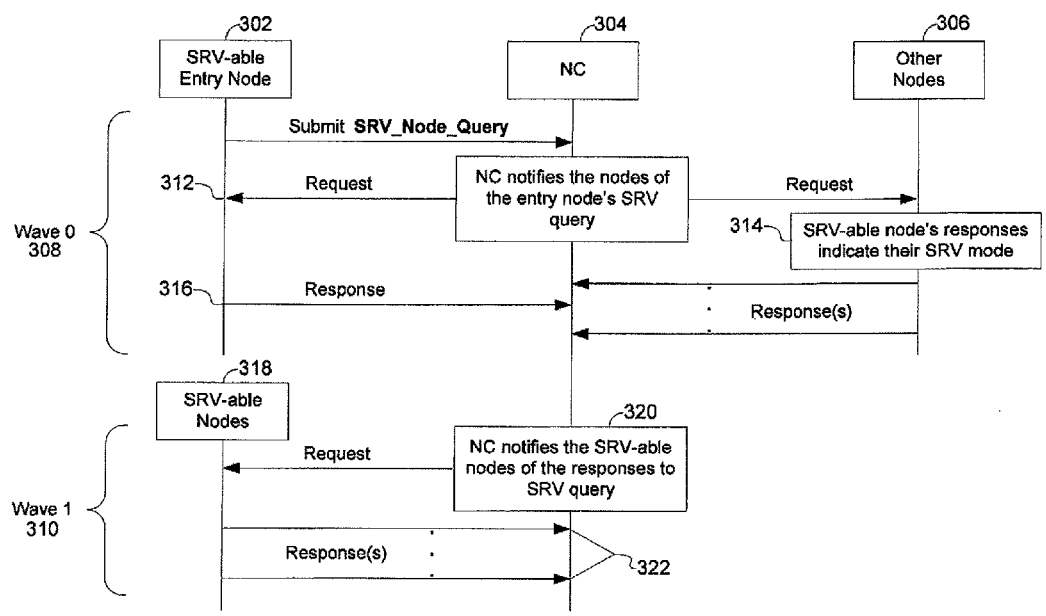
FIG. 3 shows a schematic diagram of an exemplary embodiment of an SRV node selection query using L2ME submission rules according to the invention.

FIG. 3 shows one embodiment of an SRV node selection query using L2ME submission rules according to the invention.

Wave 0 310 shows that, in some embodiments of the invention, any SRV-capable node 304, upon its admission to the network may submit an SRV node query to the NC 306. NC 306 may notify the other nodes 308 of the entry node's SRV query at 314. SRV-capable nodes' 316 responses may indicate their respective SRV modes, as shown at 318.

Wave 1 312 may show SRV-capable nodes 318 receiving a notification 320 from NC 304. Notification 320 may preferably include the responses to the SRV query. Responses to notification 320 may be sent to the NC at 322.

At the end of the query, all SRV-capable nodes 318, including entry node 302, preferably share the same information regarding which nodes on the network are SRV-capable and which single node, if any, is the SRV-selected node. If there is no SRV-selected node, the SRV-capable node with the lowest node ID ("NID"), or any other suitably selectable node, can become the SRV-selected node and can submit an SRV Node Select to notify the other SRV-capable nodes.

If the SRV-selected node is removed from the network, either by graceful shut down, power save, and/or fails, preferably thereafter, in one embodiment of the invention, the SRV-capable node with lowest NID becomes the SRV-selected node and submits SRV Node Select to notify the other SRV-capable nodes.

Figure 4:
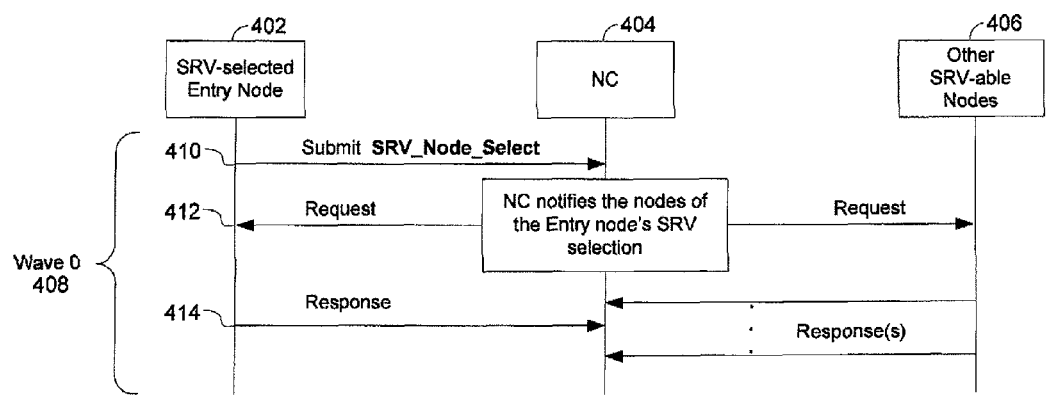
FIG. 4 shows a schematic diagram of details of each message exchanged during a node selection transaction according to the invention.

FIG. 4 shows an SRV node selection query using L2ME submission rules according to the invention. Specifically, FIG. 4 shows a schematic diagram of one embodiment of a method that shows the process followed, according to the invention, in which a node that requires SRV operates when the SRV-selected node shuts down, either through selection or because of power save and/or fails. FIG. 4 shows a Wave 0 408 which includes communication, following an SSN node link failure, between an entry node 402 with the lowest node ID ("NID"), an NC 404 and other SRV-capable nodes 406. According to the invention, at SRV-selected node link down, the SRV-capable node with the relatively lowest NID becomes the SRV-selected node and sends an SRV node selection Submit L2ME message.

Specifically, SRV-selected entry node 402 preferably shows submission of an SRV Node Select 408. The submission preferably notifies the other SRV-capable nodes SRV selection submission, 410. At 412, the SRV-capable nodes 402/406 may preferably respond to NC 404 regarding submission 408.

Thus, one method has been shown that after a link failure between the SSN and the network, one of the SRV-capable node may send an SRV node selection submit L2ME message to the NC.

It should be reiterated that, in addition to node selection upon failure, prior to entering power save mode and/or shut-OFF, the prior SRV-selected node may also remove itself from the group of SKY-capable nodes and sends a L2ME message indicating its non-availability.

An exemplary L2ME SRV Confirmation Transaction according to the invention is set forth below in FIG. 5, and portions of the specification corresponding thereto. The NC node may start the transaction either when it receives a Submit L2ME Frame from an entry node or independently—i.e., without receiving a prompt from another node.

Figure 5:
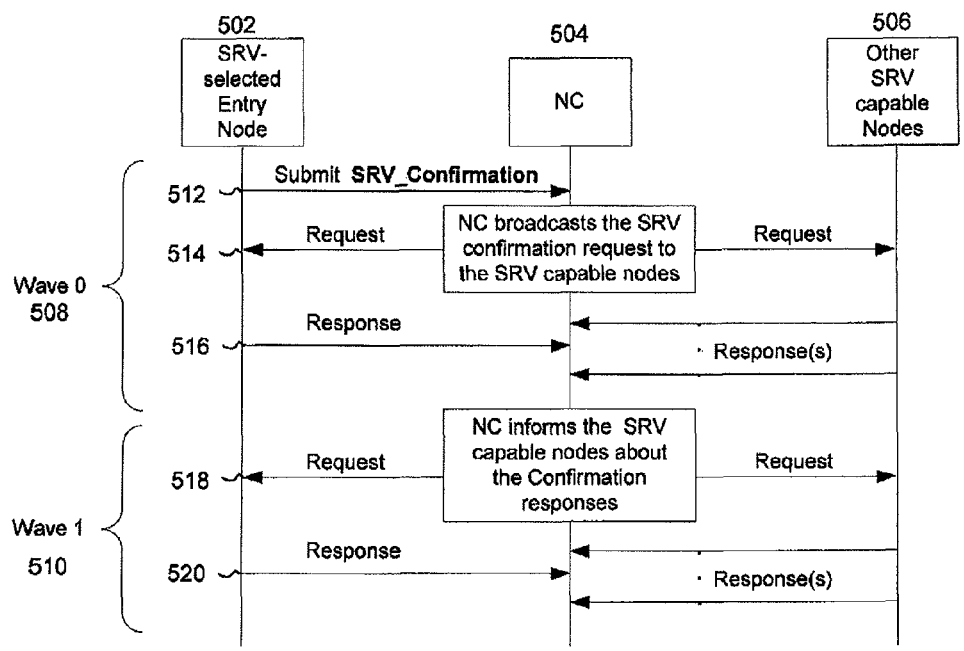
FIG. 5 shows a schematic diagram of details of each message exchanged during a node confirmation transaction according to the invention.

FIG. 5 shows one embodiment of an SRV node selection L2ME confirmation transaction according to the invention. FIG. 5 shows entry node 502, NC 504, SRV-capable nodes 506, wave 0 508 and wave 1 510. Specifically, at 512, entry node 502 transmits a submit L2ME frame to trigger SRV node confirmation to NC 504.

NC 504, at 514, preferably notifies all the nodes of the network of entry node's 502 SRV node confirmation submission.

SRV-capable nodes 506 preferably send a response, at 514.

In certain embodiments of the invention, nodes which do not support SRV (not shown), may preferably return general L2ME response error codes.

One embodiment of a possible L2ME Wave 1 Request 510 is shown after Wave 0 508.

In Wave 1 510, NC 504 preferably notifies node 502, as well as nodes 506, of the responses, as shown at 518, to the SRV node confirmation submission in L2ME. This notification may preferably be implemented in the concatenated payload format available in L2ME.

Using the responses received in step 518, entry node 502 may confirm an SRV notification message to indicate:
the SRV-Selected NID; and
the SRV-capable NID bitmask.

An SRV-capable node can preferably include an IEEE SRV Device Attribute Information Element (see FIG. 6, and the portion of the specification corresponding thereto) with the L2ME payload of the device discovery protocol submit L2ME transaction message specified in the MoCA v2.0 Specifications of the Multimedia over Coax Alliance. Such an inclusion may preferably include information that effectively forms an overlay over the MoCA L2ME protocol. Such an overlay is possible because the L2ME protocol in MoCA has provision to transport a vendor specific information element which is not interpreted by MoCA. Accordingly, the L2ME protocol is left untouched as defined in MoCA. The only request is to get a vendor ID value allocated to the specific entity the SRV belongs to. For example, one could have a vendor ID allocated to a company called ACME. In turn, ACME could define several TLV TYPEs for multiple services (SRVs).

As further described herein, upon completion of the L2ME Device Discovery transaction, preferably all the SRV-capable nodes of the MoCA network may preferably share the same information regarding other SRV-capable nodes. Such information may include:
1) which MoCA nodes are SRV-capable; and
2) which MoCA node is selected as the SSN.

If no node is selected as the SSN, the SSN selection preferably shall be performed.

Figure 6:
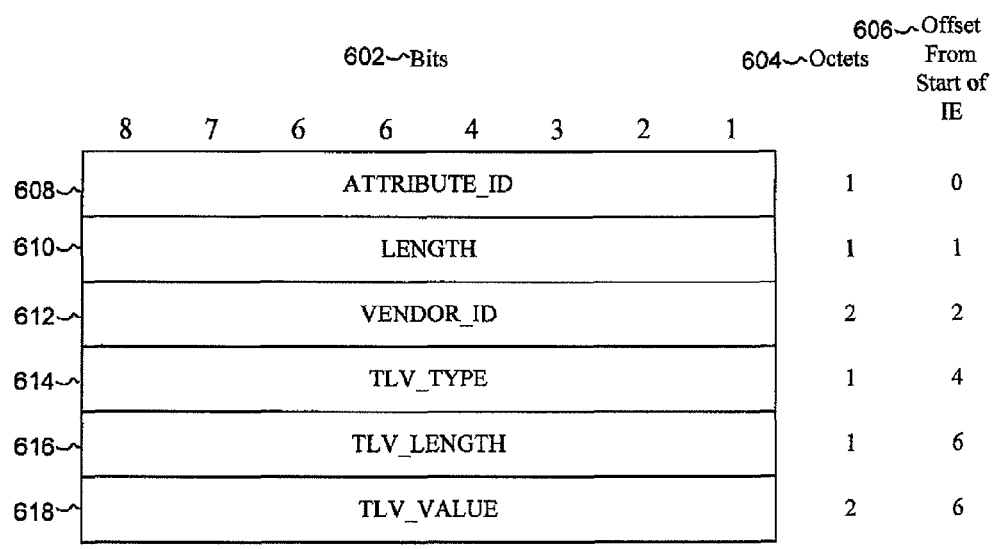
FIG. 6 is a table illustrating an IEEE SRV Device Attribute Information Element ("IE")

FIG. 6 is a table illustrating an IEEE SRV Device Attribute IE. Generally, the fields of the IEEE SRV Device Attribute IE can be as specified in the table in FIG. 6. The general format of the Device Attribute Information Element is described in the MoCA v2.0 Specifications of the Multimedia over Coax Alliance, which is hereby incorporated herein in its entirety.

The table in FIG. 6, which illustrates the IEEE SRV Device Attribute IE, shows bits 602 for each of a number of attributes, octets 604 corresponding to each of the number of attributes and offset 606 from the start of each of the IE.

In MoCA, the format of the Device Attribute Information Element is defined. The MoCA specification specifies that when the Attribute field is set to 0xFF, the first 16 bits of the Information field define a Vendor ID. Vendor ID is allocated by MoCA to specific Vendors or entities.

Whatever follows the Vendor ID is Vendor specific. In the following embodiment of the invention, TLV TYPE, TLV LENGTH and TLV VALUE are vendor specific—i.e., each vendor has a different value for these fields which is defined by the vendor, and not by MoCA specification. This means that the vendor specific message can be ignored—i.e., the MoCA L2ME protocol delivers these messages over MoCA without interpreting the content of the vendor specific message. Thus, nodes using the MoCA L2ME protocol deliver the IE to the other nodes without attempting to interpret the vendor ID message. Accordingly, the SRV selection protocol, which is implemented using TLV TYPE, TLV LENGTH and TLV VALUE, is an overlay protocol over the MoCA standard L2ME protocol.

The table in FIG. 6 illustrates the following attributes:
ATTRIBUTE ID 608;
The value of the ATTRIBUTE ID is 0xFF.
LENGTH (UInteger8) 610;
The value of the LENGTH can be 1. In certain embodiments of the invention, the actual length of the Attribute IE in bits is (LENGTH+1)*32.
VENDOR ID 612;
The value of VENDOR ID may preferably be assigned by the MoCA Alliance and any such assignment is incorporated by reference herein.
TLV TYPE 614; (For example, SRV IEEE Audio Video Bridging Systems ("AVB") (IEEE 802.1Qat), may implement a value of the TLV TYPE as 0. In other embodiments of the invention, this TLV TYPE may be specified to the same or another suitable value(s) for other suitable services)
TLV LENGTH 616; (the length is needed for implementation of the service specified in TLV TYPE 614)
TLV VALUE 618;

It should be noted that an IE according to the invention may include, in the TLV VALUE field, two bitmasks (not shown): one for indicating whether the node is SRV-capable and one for indicating whether this node is the SRV-selected node.

In the first bitmask of the TLV VALUE field, asserting to 1 the bit corresponding to the node's ID may indicate the node is capable of acting as the SRV-capable node of the network. A value of 0 may indicate the node is not capable to act as an SRV-capable node of the network.

In the second bitmask of the TLV VALUE field, asserting to 1 the bit corresponding to the node's ID may indicate the node is the node selected as the SRV node of the network. A value of 0 may indicate the node is not the selected node. The second bitmask is needed either to define whether a selected node exists on the network or, if there is no selected node on the network, then the first bitmask indicates which nodes are SRV-capable and, based on the selection criteria—e.g., the node with the lowest MD—which node should be selected as the SRV node. The second bitmask also indicates to the other SRV-capable nodes that one node has already been selected. This may prevent conflicts based on other nodes requesting to becoming the SRV node.

Regarding SRV selection and confirmation according to the invention: if either 1) the SRV-selected node indicates that the selected SRV node has been removed from the network (due to failure, power state/down, etc.) or 2) the SRV-capable node discovery does not indicate an SRV-selected node, the SRV-capable node with the lowest node ID, or another suitably-selected node, can start acting as the SRV and can confirm the selection to the other SRV-capable nodes by generating a L2ME SRV Confirmation Transaction.

Figure 7:
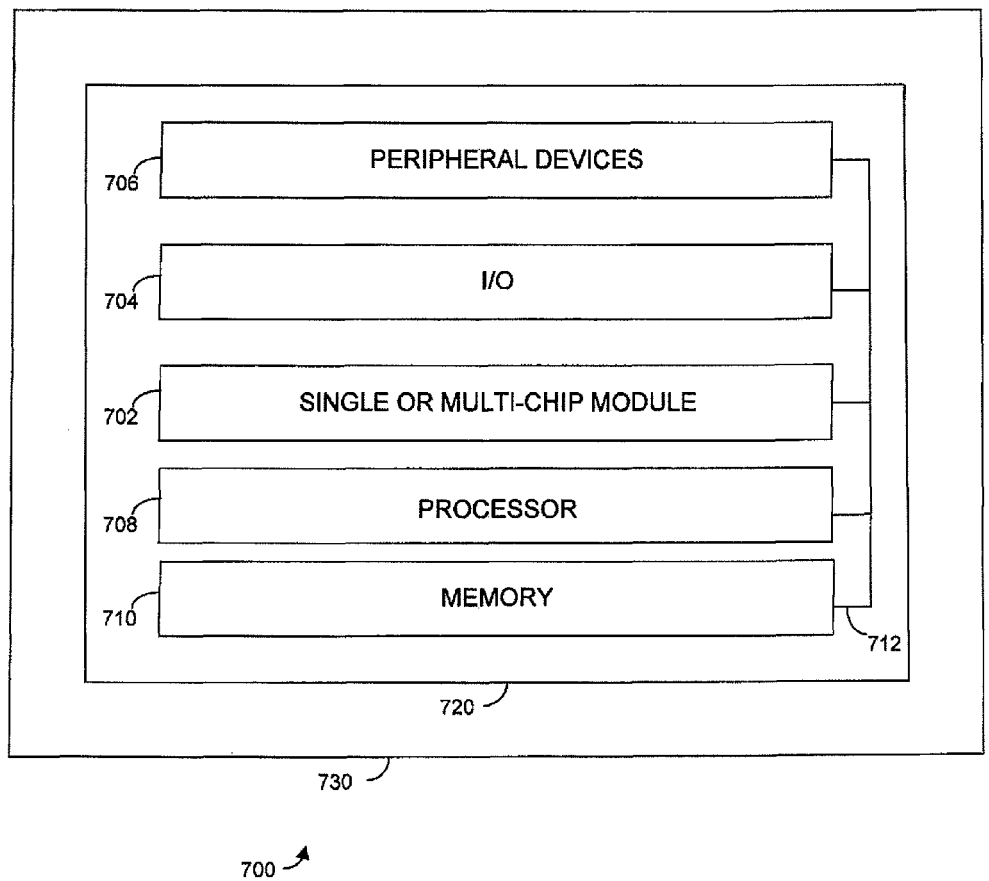
FIG. 7 is a schematic diagram of an illustrative single or multi-chip module of the invention in a data processing system.

FIG. 7 shows a single or multi-chip module 702 according to the invention, which can be one or more integrated circuits, in an illustrative data processing system 700 according to the invention. Data processing system 700 may include one or more of the following components: I/O circuitry 704, peripheral devices 706, a processor 708 and memory 710. These components are coupled together by a system bus or other interconnections 712 and are populated on a circuit board 720 which is contained in an end-user system 730. System 700 may be configured for use in a cable television tuner according to the invention. It should be noted that system 700 is only exemplary, and that the true scope and spirit of the invention should be indicated by the following claims.

Thus, systems and methods for providing a MoCA SSN selection strategy have been described.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

What is claimed is:

1. A method for using a node in a home communications network, the home communications network including a plurality of nodes and a coaxial cable, the method comprising:
   receiving a query message from an entry node that is encapsulated within selected fields of a Device Attribute Information Element in L2ME protocol, the entry node being a node that requires an audio/video bridging ("AVB") service, the entry node not being aware at the time of the query message as to which node of the plurality of nodes is capable of supporting the AVB service on the network, wherein the entry node and a network controller node are each one of the plurality of nodes and said selected fields include vendor specific fields;
   distributing the query message to the plurality of nodes;
   transmitting, to at least the entry node, information as to which, if any, of the plurality of nodes is capable of supporting the AVB service on the home communications network; and
   in response to the transmitted information, receiving an indication from the entry node as to which of the plurality of nodes to select for supporting the AVB service on the home communications network,
   wherein the node selected for supporting the AVB service on the home communications network is a designated Multiple Stream Reservation Protocol ("MRSP") node, and
   wherein the network controller node cannot be selected to support the AVB service.

2. The method of claim 1, wherein the vendor specific fields include at least one of the TLV TYPE, TLV LENGTH and TLV VALUE fields.

3. The method of claim 1, further comprising: if no node of the plurality of nodes responds to the query message, receiving a message from the entry node indicating that the entry node selected itself to support the AVB service on the home communications network.

4. The method of claim 1, further comprising: receiving a notification from the entry node of a selection by the entry node.

5. The method of claim 1, further comprising: if no node of the plurality of nodes responds to the query message, selecting a node with the lowest node identification to support the AVB service on the network.

6. The method of claim 5, further comprising: notifying the plurality of nodes that the node with the lowest node identification has been selected to support the AVB service on the network.

7. The method of claim 6, further comprising: if the communication link between the selected node and the network is terminated, then sending a communication via network notification to the network.

8. A method for using a node in a home communications network, the home communications network including a plurality of nodes and a coaxial cable, the method comprising:
   receiving a query message from an entry node that is in at least one of the TLV TYPE, TLV LENGTH and TLV VALUE fields of a Device Attribute Information Element in L2ME protocol, the entry node being a node that requires an audio/video bridging ("AVB") service, the entry node not being aware at time of the query message which node of the plurality of nodes is capable of running the AVB service for all nodes connected to the home communications network, wherein the entry node and a network controller node are each one of the plurality of nodes and said selected fields include vendor specific fields;
   distributing the query message to the plurality of nodes;
   transmitting, to at least the entry node, information as to which, if any, of the plurality of nodes is capable of running the AVB service on the home communications network; and
   in response to the transmitted information, receiving an indication from the entry node as to which of the plurality of nodes to select to run the AVB service for all nodes connected to the home communications network;
   wherein the node selected for supporting the AVB service on the home communications network is a designated Multiple Stream Reservation Protocol ("MSRP") node, and
   wherein the network controller node cannot be selected to support the AVB service.

9. The method of claim 8, further comprising: if no node of the plurality of nodes responds to the query message, receiving a message from the entry node indicating that the entry node selected itself to support the AVB service on the home communications network.

10. The method of claim 9, further comprising: receiving a notification from the entry node of a selection by the entry node.

11. The method of claim 8, further comprising: if no node of the plurality of nodes responds to the query message, selecting a node with the lowest node identification to support the AVB service on the network.

12. The method of claim 11, further comprising: notifying the plurality of nodes that the node with the lowest node identification has been selected to support the AVB service on the network.

13. The method of claim 12, further comprising: if the communication link between the selected node and the network is terminated, then sending a communication via network notification to the network.

14. A method for using a node in a home communications network, the home communications network including a plurality of nodes and a coaxial cable, the method comprising:
  receiving a selection message from an entry node, the selection message in selected fields of a Device Attribute Information Element in L2ME protocol, the entry node being a node that requires an audio/visual bridging ("AVB") service, wherein the entry node and a network controller node are each one of the plurality of nodes and said selected fields include vendor specific fields;
  distributing the selection message to the plurality of nodes;
  transmitting, to at least the entry node, information as to which, if any, of the plurality of nodes can be selected for running the AVB service on the home communications network; and
  in response to the transmitted information, receiving an indication from the entry node as to which of the plurality of nodes to select for supporting the AVB service on the home communications network;
  wherein the node selected for supporting the AVB service on the home communications network is a designated Multiple Stream Reservation Protocol ("MSRP") node, and
  wherein the network controller node cannot be selected to support the AVB service.

15. The method of claim 14, wherein the vendor specific fields include at least one of the TLV TYPE, TLV LENGTH and TLV VALUE fields.

16. The method of claim 14, further comprising: if no node of the plurality of nodes responds to the selection message, receiving a message from the entry node indicating that the entry node selected itself to support the AVB service on the home communications network.

17. The method of claim 16, further comprising: receiving a notification from the entry node of a selection by the entry node.

18. The method of claim 14, further comprising: if no node of the plurality of nodes responds to the selection message, selecting a node with the lowest node identification to support the AVB service on the network.

19. The method of claim 18, further comprising: notifying the plurality of nodes that the node with the lowest node identification has been selected to support the AVB service on the network.

20. The method of claim 19, further comprising: if the communication link between the selected node and the network is terminated, then sending a communication via network notification to the network.

21. A method for using a node in a home communications network, the home communications network including a plurality of nodes and a coaxial cable, the method comprising:
  receiving, from an entry node, a confirmation message with an indication to confirm a node of the plurality of nodes selected by the entry node to support an audio/video bridging (AVB) service on the home communications network, the entry node being a node that requires the AVB service, wherein the entry node and a network controller node are each one of the plurality of nodes and said selected fields include vendor specific fields;
  distributing the confirmation message to the plurality of nodes;
  in response to the confirmation message, receiving an acknowledgment message from the plurality of nodes;
  wherein the node selected for supporting the AVB service on the network is a designated Multiple Stream Reservation Protocol ("MSRP") node; and
  wherein the network controller node cannot be selected to support the AVB service.

22. The method of claim 21, further comprising: receiving a notification from the entry node of a selection by the entry node.

23. A method for using a node in a home communications network, the home communications network including a plurality of nodes and a coaxial cable, the method comprising:
  receiving, from an entry node, a confirmation message in at least one of the TLV TYPE, TLV LENGTH and TLV VALUE fields of a Device Attribute Information Element in L2ME protocol, the confirmation message comprising an indication to confirm a node of the plurality of nodes selected by the entry node to support an audio/video bridging (AVB) service on the home communications network, wherein the entry node and a network controller node are each one of the plurality of nodes and said TLV TYPE, TLV LENGTH and TLV VALUE fields include vendor specific fields;
  distributing, from a network controller (NC) node, the confirmation message to the plurality of nodes;
  in response to the confirmation message, receiving an acknowledgment message from the plurality of nodes,
  wherein the plurality of nodes that can be selected for supporting the AVB service on the network are Multiple Stream Reservation Protocol ("MRSP") nodes; and
  wherein the network controller node cannot be selected to support the AVB service.

24. The method of claim 23, further comprising: selecting one of the plurality of nodes that is capable of supporting the AVB service on the home communications network.

25. The method of claim 24, further comprising: sending a notification of the selection to the home communications network.

26. A method for using a node in a home communications network, the home communications network including a plurality of nodes and a coaxial cable, the method comprising:
  receiving, from an entry node, a confirmation message in vendor specific fields of a protocol, the protocol for use in conjunction with the home communications network, the confirmation message providing an indication to confirm a node of the plurality of nodes selected by the entry node to support an audio/video bridging (AVB) service on the home communications network;
  distributing the confirmation message to the plurality of nodes; and
  in response to the confirmation message, receiving an acknowledgment message from the plurality of nodes.

27. The method of claim 26, further comprising: selecting one of the plurality of nodes that is capable of supporting the AVB service on the home communications network.

28. The method of claim 27, further comprising: sending a notification of the selection to the home communications network.

29. A network controller node in a home communications network, the home communications network including a plurality of other nodes and a coaxial cable, the network controller node configured to:
  receive a confirmation message from an entry node regarding an audio/video bridging ("AVB") service on the home communications network, the confirmation message containing at least one of a plurality of vendor specific fields of a protocol, the protocol for use in conjunction with the home communications network, the confirmation message comprising an indication to confirm a node of the plurality of other nodes selected by the entry node to support the AVB service on the home communications network;

distribute the confirmation message to the plurality of other nodes; and in response to the distribution of the confirmation message, receive an acknowledgment message from the plurality of other nodes;

wherein the plurality of other nodes that can be selected for supporting the AVB service on the network are Multiple Stream Reservation Protocol ("MSRP") nodes, and wherein the network controller node cannot be selected to support the AVB service.

30. An entry node for use in a home communications network, the home communications network including a plurality of nodes and a coaxial cable, the entry node configured to:

submit a query message in at least one of selected fields of a Device Attribute Information Element in L2ME protocol, the entry node being a node that requires an audio/visual bridging ("AVB") service, the entry node not possessing information regarding as to which node of the plurality of nodes is capable of supporting the AVB service on the home communications network, wherein the entry node and a network controller node are each one of the plurality of nodes and said selected fields include a plurality of vendor specific fields, wherein the query message is distributed to the plurality of nodes by the home communications network, in response to the query message, receive information regarding which of the plurality of nodes has capabilities to support the AVB service on the home communications network; and select one of the plurality of nodes that has capabilities to support the AVB service on the home communications network based on the received information, wherein the node that has been selected for supporting the AVB service on the home communications network is a Multiple Stream Reservation Protocol ("MSRP") node, and wherein the network controller node cannot be selected to support the AVB service.

31. The entry node of claim 30, wherein the vendor specific fields include at least one of the TLV TYPE, TLV LENGTH and TLV VALUE fields.

32. The entry node of claim 30, wherein, if no node of the plurality of nodes responds to the query message, the entry node is further configured to select itself to support the AVB service on the home communications network.

33. The entry node of claim 30, wherein the entry node is further configured to send a notification of a selection by the entry node to the plurality of nodes.

34. A method of providing a service-selected node in a communications network, the method comprising:

receiving, from an entry node, a query message requesting an indication as to which one of a plurality of nodes on the communications network is selected to run an advanced service for the plurality of nodes, wherein the entry node is one of the plurality of nodes;

distributing the query message to the plurality of nodes;

in response to the query message, receiving a response from at least one of the plurality of nodes that is capable of running the advanced service for the plurality of nodes if no node of the plurality of nodes has been selected to run the advanced service;

distributing the response to at least the entry node as to which of the plurality of nodes is capable of running the advanced service for the plurality of nodes; and in response to the distributed response, receiving a response from the entry node with an indication as to which of the plurality of nodes to select for supporting the advanced service on the communications network.

* * * * *